Dec. 18, 1923.

A. G. PALMER 1,477,847

MAGNETIZING APPARATUS

Filed July 15, 1922

Inventor
Aaron G. Palmer

Patented Dec. 18, 1923.

1,477,847

UNITED STATES PATENT OFFICE.

AARON G. PALMER, OF MADISON, WISCONSIN, ASSIGNOR TO MADISON BATTERY AND SERVICE COMPANY, OF MADISON, WISCONSIN.

MAGNETIZING APPARATUS.

Application filed July 15, 1922. Serial No. 575,421.

*To all whom it may concern:*

Be it known that I, AARON G. PALMER, a citizen of the United States, and resident of Madison, in the county of Dane and State of Wisconsin, have invented certain new and useful Improvements in Magnetizing Apparatus; and I do hereby declare that the following is a full, clear, and exact description thereof.

This invention relates to magnetizers and more particularly to an apparatus for magnetizing the magnets of a magneto.

The primary object of the invention resides in the provision of a plurality of electromagnets and yieldable means for normally supporting a magneto above the same, whereby upon energizing the electromagnets, the poles of the magneto are attracted and a sudden impact is obtained between the two, thus jarring the molecules in the magneto magnets, which facilitates and ensures a maximum saturation of magnetic flux.

A more specific object resides in the provision of a device of the above character which is adapted to receive and simultaneously energize all of the poles of a conventional fly wheel type magneto.

With the foregoing and other objects in view, which will be more apparent as the description proceeds, my invention consists in what is herein shown and described and more particularly pointed out and defined by the appended claims, it being borne in mind that various modifications of the structural details are contemplated as within the appended claims.

Figure 1:
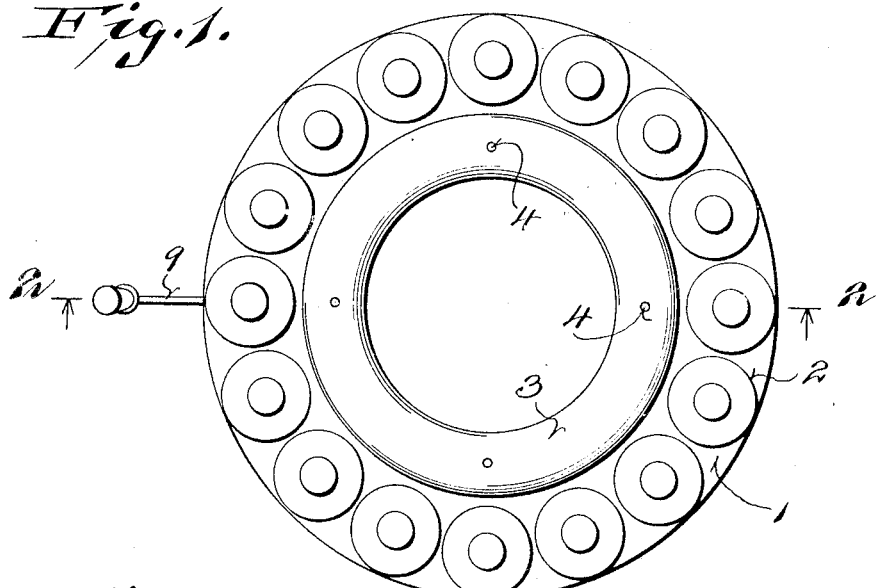
Figure 1 is a plan view of the invention.

I am aware that it is old, at the present time, to employ a pair of energized electromagnets which are passed over the poles of a magneto for the purpose of magnetizing the same. This, however, is a tedious operation requiring considerable time and resulting in an uneven saturation of magnetic flux in each pole.

In the present invention, which is primarily designed to overcome the foregoing objections by simultaneously and quickly magnetizing all of the poles of a magneto in such manner as to ensure a maximum and even saturation of magnetic flux, the numeral 1 designates a base plate upon which are circularly mounted a plurality of electromagnets 2. Positioned interiorly of the electromagnets is a magneto supporting ring 3, slidably connected with the base 1 by means of the studs 4, having nuts 5 threaded thereon, to limit their upward movement. Mounted on the studs and disposed between the base 1 and the supporting ring 3, are springs 6, adapted to normally hold the ring in its raised position, slightly above the top of the electromagnets 2.

In the present embodiment of the invention, wherein the same is designed for portability, I propose to mount the base 1 upon a plurality of supporting legs 7, to which is attached a frame 8, adapted to support a conventional storage battery B, which supplies the current for energizing the electromagnets.

In order to selectively energize or de-energize the electromagnets 2, a conventional manual switch 9 is conveniently attached to the apparatus.

Figure 2:
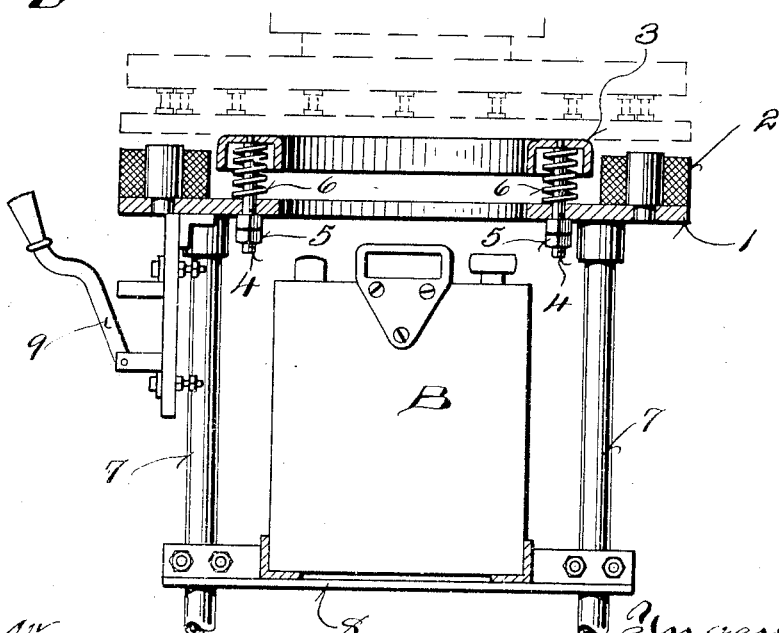
Figure 2 is a vertical section taken on the line 2—2 of Figure 1.

In the operation of the device, the magneto is placed upon the support 3, as indicated by dotted lines in Figure 2, the particular magneto illustrated being of the flywheel or circular type, provided with a plurality of poles, adapted to register with the electromagnets 2. As the switch 9 is closed, the electromagnets 2 become energized and attract the poles of the magneto, the springs 6 allowing the ring 3 to yield, which results in a sudden and strong impact between the electromagnets and the poles of the magneto. When the switch 9 is open, the springs 6 are of sufficient strength to again raise the magneto supported on the ring 3, the operation is then repeated and it is obvious that the suddent impact and resulting jar upon the poles of the magneto will cause a shifting of their molecules which is essential to a maximum saturation of magnetic flux.

While the present invention is illustrated and described as adaptable to a circular or flywheel type of magneto, it is obvious that by modifying the structure, the same principle may be applied to a magneto of any shape, and having any number of poles, such as a magneto employing a single horse shoe magnet.

It will further be understood that while I have shown and described the energizing current for the electromagnets 2 as being supplied by a storage battery, I do not desire to limit the invention to any particular source of supply, nor is it essential that the device be constructed as a portable outfit, as the same could be built integral with a bench or other form of support.

I claim:

1. An apparatus of the character described comprising a base plate, a plurality of electromagnets mounted on said plate, a magneto support normally positioned above the electromagnets, and yieldable means to permit depression of said support, whereby the magneto is drawn into contact with the electromagnets upon energizing the latter.

2. An apparatus of the character described comprising a base plate, a plurality of electromagnets circularly mounted on said plate, yieldable means adapted to normally support a flywheel type magneto above said electromagnets, whereby a sudden impact is obtained between the poles of the magneto and the electromagnets upon energizing the latter.

3. An apparatus of the character described comprising a base plate, a plurality of electromagnets circularly mounted on said base, a ring adapted to receive a flywheel type magneto, springs normally holding the ring in its raised position and allowing depression of the same, whereby a sudden impact between the magneto and electro coils is obtained upon energizing the latter.

4. An apparatus of the character described comprising a base plate, a plurality of electromagnets circularly mounted on said plate, a support positioned interiorly of the electromagnets and adapted to receive a flywheel type magneto having a plurality of poles adapted to register with said electromagnets, studs carried by said support and slidably connecting the same to the base and springs disposed between said support and base, whereby the former is normally held in raised position and depressed upon energizing the electromagnets.

In testimony that I claim the foregoing I have hereunto set my hand at Madison, in the county of Dane and State of Wisconsin.

AARON G. PALMER.